(12) United States Patent
Zhang et al.

(10) Patent No.: US 11,643,924 B2
(45) Date of Patent: May 9, 2023

(54) DETERMINING MATRIX PERMEABILITY OF SUBSURFACE FORMATIONS

(71) Applicant: Saudi Arabian Oil Company, Dhahran (SA)

(72) Inventors: Jilin Jay Zhang, Cypress, TX (US); Hui-Hai Liu, Katy, TX (US); Jewel Duncan, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 371 days.

(21) Appl. No.: 16/998,243

(22) Filed: Aug. 20, 2020

(65) Prior Publication Data

US 2022/0056798 A1    Feb. 24, 2022

(51) Int. Cl.
*E21B 47/117* (2012.01)
*G01N 7/10* (2006.01)
(Continued)

(52) U.S. Cl.
CPC .............. *E21B 47/117* (2020.05); *G01N 7/10* (2013.01); *G01N 15/0806* (2013.01); *G01N 15/0826* (2013.01); *E21B 49/008* (2013.01)

(58) Field of Classification Search
CPC ...... E21B 47/117; E21B 49/00; E21B 49/008; E21B 49/02; G01F 1/88; G01F 1/36; G01F 1/37; G01F 1/40; G01F 5/005; G01F 7/005; G01F 1/34; G01F 1/48; G01N 7/00; G01N 7/10; G01N 15/0806; G01N 15/08; G01N 15/082; G01N 15/0826; G01N 2015/1025;
(Continued)

(56) References Cited

U.S. PATENT DOCUMENTS 2,801,698 A    8/1957    Bond
4,135,579 A    1/1979    Rowland et al.
(Continued)

FOREIGN PATENT DOCUMENTS

CN    1621803    6/2005
CN    101819111    9/2010
(Continued)

OTHER PUBLICATIONS

U.S. Appl. No. 17/540,013, Zhang et al., filed Dec. 1, 2021.
(Continued)

*Primary Examiner* — Daniel R Miller
*Assistant Examiner* — Eric Sebastian Von Wald
(74) *Attorney, Agent, or Firm* — Fish & Richardson P.C.

(57) ABSTRACT

Systems, methods, and apparatus for determining permeability of subsurface formations are provided. In one aspect, a method includes: positioning a sample of the subsurface formation in a measurement cell, fluidly connecting an inlet and an outlet of the sample to an upstream reservoir and a downstream reservoir, respectively, flowing a fluid through the sample from the upstream reservoir to the downstream reservoir, measuring changes of an upstream pressure associated with the upstream reservoir and a downstream pressure associated with the downstream reservoir in a measurement time period, and determining a matrix permeability of the subsurface formation based on measurement data before the upstream pressure and the downstream pressure merge at a merging time point.

20 Claims, 5 Drawing Sheets

(51) Int. Cl.
*G01N 15/08* (2006.01)
*E21B 49/00* (2006.01)

(58) Field of Classification Search
CPC .. G01V 2210/6246; G05B 2219/37409; G05B 2219/37401
See application file for complete search history.

(56) References Cited

U.S. PATENT DOCUMENTS

| | | | |
|---|---|---|---|
| 4,193,451 A | 3/1980 | Dauphine | |
| RE30,738 E | 9/1981 | Bridges et al. | |
| 4,345,650 A | 8/1982 | Wesley | |
| 4,389,878 A | 6/1983 | Manzie, Jr. | |
| 4,444,058 A | 4/1984 | Ratigan | |
| 4,485,869 A | 12/1984 | Sresty | |
| 4,587,739 A | 5/1986 | Holcomb | |
| 4,665,982 A | 5/1987 | Brown | |
| 4,665,990 A | 5/1987 | Perlman | |
| 4,749,038 A | 6/1988 | Shelley et al. | |
| 5,023,551 A | 6/1991 | Kleinberg et al. | |
| 5,193,396 A | 3/1993 | Gorski | |
| 5,387,865 A | 2/1995 | Jerosch-Herold et al. | |
| 5,435,187 A | 7/1995 | Ewy | |
| 5,486,762 A | 1/1996 | Freedman et al. | |
| 5,757,473 A | 5/1998 | Kanduth et al. | |
| 5,869,750 A | 2/1999 | Onan | |
| 6,012,520 A | 1/2000 | Yu et al. | |
| 6,193,396 B1 | 2/2001 | Gorski | |
| 7,091,719 B2 | 8/2006 | Freedman | |
| 7,703,531 B2 | 4/2010 | Huang | |
| 7,828,057 B2 | 11/2010 | Kearl et al. | |
| 8,584,755 B2 | 11/2013 | Willberg | |
| 8,646,524 B2 | 2/2014 | Al-Buriak | |
| 8,701,760 B2 | 4/2014 | Parsche | |
| 8,701,770 B2 | 4/2014 | Schultz | |
| 8,877,041 B2 | 11/2014 | Parsche | |
| 9,222,902 B2 | 12/2015 | Gruber et al. | |
| 9,653,812 B2 | 5/2017 | Yan | |
| 9,896,919 B1 | 2/2018 | Chen | |
| 10,047,281 B2 | 8/2018 | Nguyen | |
| 10,180,054 B2 | 1/2019 | Chen | |
| 10,202,827 B2 | 2/2019 | Delchambre | |
| 10,309,202 B2 | 6/2019 | Soliman | |
| 10,401,274 B2 | 9/2019 | Liu et al. | |
| 10,443,367 B2 | 10/2019 | Chen | |
| 10,571,384 B2 | 2/2020 | Liu et al. | |
| 10,837,278 B2* | 11/2020 | Zhu | E21B 49/003 |
| 2001/0032055 A1 | 10/2001 | Omar | |
| 2003/0209248 A1 | 11/2003 | Ward | |
| 2005/0016732 A1 | 1/2005 | Brannon | |
| 2005/0059558 A1 | 3/2005 | Blauch et al. | |
| 2005/0103118 A1 | 5/2005 | Workman | |
| 2007/0054054 A1 | 3/2007 | Svoboda et al. | |
| 2008/0093073 A1 | 4/2008 | Bustos et al. | |
| 2009/0032252 A1 | 2/2009 | Boney et al. | |
| 2009/0095469 A1 | 4/2009 | Dozier | |
| 2009/0242196 A1 | 10/2009 | Pao | |
| 2009/0277634 A1 | 11/2009 | Case | |
| 2009/0283257 A1 | 11/2009 | Becker | |
| 2010/0154514 A1 | 6/2010 | Algive | |
| 2010/0243242 A1 | 9/2010 | Boney et al. | |
| 2010/0263867 A1 | 10/2010 | Horton et al. | |
| 2011/0083849 A1 | 4/2011 | Medvedev | |
| 2011/0108277 A1 | 5/2011 | Dudley et al. | |
| 2012/0018159 A1 | 1/2012 | Gulta et al. | |
| 2012/0061081 A1 | 3/2012 | Sultenfuss et al. | |
| 2012/0129737 A1 | 5/2012 | Lesko et al. | |
| 2012/0261129 A1 | 10/2012 | Becker | |
| 2012/0273193 A1 | 11/2012 | Sen et al. | |
| 2012/0318498 A1 | 12/2012 | Parsche | |
| 2013/0213120 A1 | 8/2013 | Lebedev | |
| 2013/0213638 A1 | 8/2013 | Keller | |
| 2013/0228019 A1 | 9/2013 | Meadows | |
| 2013/0233536 A1 | 9/2013 | Alqam | |
| 2013/0282386 A1 | 10/2013 | Vilermo et al. | |
| 2013/0290064 A1 | 10/2013 | Altamirano et al. | |
| 2014/0014327 A1 | 1/2014 | Badri et al. | |
| 2014/0027109 A1 | 1/2014 | Al-Baraik | |
| 2014/0221257 A1 | 8/2014 | Roddy | |
| 2014/0225607 A1 | 8/2014 | Edwards | |
| 2014/0239956 A1 | 8/2014 | Hoversten | |
| 2015/0055438 A1 | 2/2015 | Okoniewski | |
| 2015/0057097 A1 | 2/2015 | Cho | |
| 2015/0083420 A1 | 3/2015 | Gupta et al. | |
| 2015/0103624 A1 | 4/2015 | Thompson | |
| 2015/0112488 A1 | 4/2015 | Hoehn et al. | |
| 2015/0152724 A1 | 6/2015 | Amendt | |
| 2015/0167439 A1 | 6/2015 | Kasevich et al. | |
| 2015/0167440 A1 | 6/2015 | Kasevich | |
| 2015/0192005 A1 | 7/2015 | Saeedfar | |
| 2015/0300968 A1 | 10/2015 | Bae et al. | |
| 2015/0322759 A1 | 11/2015 | Okoniewski | |
| 2016/0103047 A1 | 4/2016 | Liu | |
| 2016/0103049 A1 | 4/2016 | Liu | |
| 2016/0170067 A1 | 6/2016 | Heaton | |
| 2016/0208602 A1 | 7/2016 | Donderici et al. | |
| 2016/0215205 A1 | 7/2016 | Nguyen | |
| 2016/0230549 A1 | 8/2016 | Minh et al. | |
| 2016/0341020 A1 | 11/2016 | Al-Buriak | |
| 2016/0379356 A1 | 12/2016 | Louis | |
| 2017/0016812 A1 | 1/2017 | Liu et al. | |
| 2017/0032078 A1 | 2/2017 | Stelzer et al. | |
| 2017/0145303 A1 | 5/2017 | Fontenelle et al. | |
| 2017/0167964 A1* | 6/2017 | Liu | G01N 33/24 |
| 2017/0175505 A1 | 6/2017 | Curlett | |
| 2017/0370895 A1 | 12/2017 | Han | |
| 2018/0348111 A1 | 12/2018 | Hannon | |
| 2019/0226970 A1 | 7/2019 | Dusterhoft et al. | |
| 2020/0032636 A1 | 1/2020 | Chen et al. | |
| 2022/0042898 A1* | 2/2022 | Zhao | G01N 33/24 |

FOREIGN PATENT DOCUMENTS

| | | | | |
|---|---|---|---|---|
| CN | 102183410 | | 9/2011 | |
| CN | 105784489 A | * | 7/2016 | G01N 15/0826 |
| CN | 109975140 | | 7/2019 | |
| WO | WO 2012051647 | | 4/2012 | |
| WO | WO 2012057910 | | 5/2012 | |
| WO | WO 2013155061 | | 10/2013 | |
| WO | WO 2016163983 | | 10/2016 | |

OTHER PUBLICATIONS

APMonitor.com [online], "Proportional integral derivative (PID)," Sep. 2020, retrieved Oct. 13, 2021 from URL<https://apmonitor.com/pdc/index.php/Main/ProportionalIntegralDerivative>, 3 pages.

Chen et al., "Dependence of gas shale fracture permeability on effective stress and reservoir pressure: Model match and insights," Fuel, 2015, 139, 383-392, 10 pages.

Civan et al., "Comparison of shale permeability to gas determined by pressure-pulse transmission testing of core plugs and crushed samples," Unconventional Resources Technology Conference, Jul. 2015, 1 page.

Clarkson et al., "Use of pressure- and rate-transient techniques for analyzing core permeability tests for unconventional reservoirs: Part 2," SPE Unconventional Resources Conference, Nov. 2013, 5 pages.

Metarocklab.com [online], "Pumps," 2019, retrieved Oct. 13, 2021 from URL<https://www.metarocklab.com/product-page/pressure-generators>, 2 pages.

Paroscientific.com [online], "Overview & product selection guide," no date, retrieved Oct. 13, 2021 from URL<http://paroscientific.com/products.php>, 2 pages.

Tang et al., "Impact of Stress-Dependent Matrix and Fracture Properties on Shale Gas Production," Energies, 10(7): 996, Jul. 2017, 13 pages.

Zhang et al., "Matrix permeability measurement from fractured unconventional source-rock samples: Method and application," J Contam Hydrol, 233:103663, 2020, 6 pages.

(56) References Cited

OTHER PUBLICATIONS

Zheng et al., "Relationships between permeability, porosity and effective stress for low-permeability sedimentary rock," International Journal of Rock Mechanics and Mining Sciences, 78:304-318, 2015, 15 pages.
Alharbi, "Experimental Evaluation of the Effect of Carbonate Heterogeneity on Oil Recovery to Water and Gas Injections," University of Calgary, Sep. 9, 2013, 258 pages.
Alnoaimi and Kovscek, "Experimental and Numerical Analysis of Gas Transport in Shale including the Role of Sorption," SPE-166375, Society of Petroleum Engineers (SPE), presented at the SPE Annual Technical Conference and Exhibition, Sep. 30-Oct. 2, 2013, 16 pages.
Althaus et al., "Permeability Estimation of a Middle-East Tight Gas Sand with NMR Logs," URTec: 2669857, Unconventional Resources Technology Conference (URTeC), proceedings of the 5th Unconventional Resources Technology Conference, Jul. 24, 2017, 7 pages.
Amabeoku et al., "Calibration of Permeability Derived from NMR Lobs in Carbonate Reservoirs," SPE 68085, Society of Petroleum Engineers (SPE), presented at the 2001 SPE Middle East Oil Show, Mar. 17-20, 2001, 11 pages.
An et al., "A new study of magnetic nanoparticle transport and quantifying magnetization analysis in fractured shale reservoir using numerical modeling," Journal of Natural Gas Science and Engineering, 28:502-521, Jan. 2016, 21 pages.
Basu et al., "Best Practices for Shale Core Handling: Transportation, Sampling and Storage for Conduction of Analyses," Journal of Marine Science and Engineering, Feb. 2020, 8(2):136, 17 pages.
Bazant et al., "Size Effect in Brazilian Split-Cylinder Tests: Measurements and Fracture Analysis," ACI Materials Journal, 88:3 (325-332), May 31, 1991, 8 pages.
Bourbie and Walls, "Pulse decay permeability: analytical solution and experimental test," SPE Journal, 22:5, Oct. 1982, 11 pages.
Brace et al., "Permeability of granite under high pressure," Journal of Geophysics Res. 73:6, Mar. 15, 1968, 12 pages.
Brezovski and Cui, "Laboratory permeability measurements of unconventional reservoirs: useless or full of information? A montney example from the western canadian sedimentary basin," SPE-167047, Society of Petroleum Engineers (SPE), presented at the SPE Unconventional Resources Conference and Exhibition-Asia Pacific, Nov. 11-13, 2013, 12 pages.
Chen et al, "Assessing Tensile Strength of Unconventional Tight Rocks Using Microwaving," URTec: 2154488, Unconventional Resources Technology Conference (URTeC), presented at the Unconventional Resources Technology Conference, Jul. 20-22, 2015, San Antonio, Texas, USA, 12 pages.
Chen et al, "Fracturing Tight Rocks by Elevated Pore-Water Pressure Using Microwaving and its Applications," SPWLA 56th Annual Logging Symposium, Jul. 18-22, 2015, Long Beach, California, USA, 13 pages.
Chen et al., "Optimization of NMR Permeability Transform and Application to Middle East Tight Sands," Society of Petrophysicists and Well-Log Analysts, SPWLA 58th Annual Logging Symposium, Jun. 17-21, 2017, 11 pages.
Cooper et al., "The effect of cracks on the thermal expansion of rocks," Earth and Planetary Science Letters, Oct. 1, 1977, 36(3):404-12, 9 pages.
Cronin, "Core-scale heterogeneity and dual-permeability pore structures in the Barnett Shale," Thesis for Degree of Master of Science in Geological Sciences at the University of Texas at Austin, Dec. 2014, 174 pages.
Cui et al., "Measurements of gas permeability and diffusivity of tight reservoir rocks: different approaches and their applications," Geofluids, 9:3, Aug. 2009, presented at the AAPG Convention, Jun. 7-10, 2009, 18 pages.
Darabi et al., "Gas flow in ultra-tight shale strata," Journal of Fluid Mechanics, 710, Nov. 10, 2012, 20 pages.
Dicker and Smits, "A practical approach for determining permeability from laboratory pressure-pulse decay measurements," SPE-17578, Society of Petroleum Engineers (SPE), presented at the SPE international Meeting on Petroleum Engineering, Nov. 1-4, 1988, 8 pages.
Egermann et al., "A fast and direct method of permeability measurements on drill cuttings," Society of Petroleum Engineers (SPE), SPE Reservoir Evaluation and Engineering, 8:4, Aug. 2005, 7 pages.
Finsterle and Persoff, "Determining permeability of tight rock samples using inverse modeling," Water Resources Research, 33:8, Aug. 1997, 9 pages.
Forni et al., "Conditioning Pre-existing Old Vertical Wells to Stimulate and Test Vaca Muerta Shale Productivity through the Application of Pinpoint Completion Techniques," SPE-172724-MS, Society of Petroleum Engineers (SPE), presented at the SPE middle East Oil and Gas Show and Conferences, Mar. 8-11, 2015, 28 pages.
George et al., "Approximate relationship between frequency-dependent skin depth resolved from geoelectromagnetic pedotransfer function and depth of investigation resolved from geoelectrical measurements: A case study of coastal formation, southern Nigeria," Journal of Earth System Science, Oct. 1, 2016, 125(7):1379-90, 12 pages.
Han and Cundall, "LBM-DEM modeling of fluid-solid interaction in porous media," International Journal for Numerical and Analytical Methods in Geomechanics, 37:10, Jul. 2013, 17 pages.
Heller et al., "Experimental investigation of matric permeability of gas shale," AAPG Bulletin, 98:5, May 2014, 21 pages.
itascacg.com [online], "Particle Flow Code, Version 5.0," Itasca Consulting Group, Inc., available on or before Apr. 11, 2014, [retrieved on May 11, 2018], retrieved from URL: <https://www.itascacg.com/software/pfc>, 5 pages.
Jerath et al., "Improved assessment of in-situ fluid saturation with multi-dimensional NMR measurements and conventional well logs," SPWLA 53rd Annual Logging Symposium, Jun. 16-20, 2012, 16 pages.
Jianhong et al., "Estimation of the Tensile Elastic Modulus using Brazilian disc by Applying Diametrically Opposed Concentrated Loads," International Journal of Rock Mechanics & Mining Sciences, 46:3 (568-576), 2009, 9 pages.
Jones, "A Technique for Faster Pulse-Decay Permeability Measurements in Tight Rocks," presented at the 1994 SPE Annual Technical Conference and Exhibition, Sep. 25-28, 1994, SPE Formation Evaluation, Mar. 1997, 7 pages.
Kenyon, "Petrophysical Principles of Applications of NMR Logging," Society of Petrophyicists and Well-Log Analysts, 38:2, Mar. 1997, 23 pages.
Lai et al., "Experimental Investigation on Brazilian Tensile Strength of Organic-rich Gas Shale," SPE-177644-MS, Society of Petroleum Engineers (SPE), presented at the Abu Dhabi International Petroleum Exhibition and Conference, Nov. 9-12, 2015, 24 pages.
Li et al., "The Brazilian Disc Test for Rock Mechanics Applications: Review and New Insights," Rock Mech Rock Eng, 2013, 46: 269-287, 19 pages.
Liang et al., "An Experimental Study on interactions between Imbibed Fractured Fluid and Organic-Rich Tight Carbonate Source Rocks," SPE-188338-MS, Society of Petroleum Engineers (SPE), presented at the Abu Dhabi International Petroleum Exhibition and Conference, Nov. 13-16, 2017, 14 pages.
Liu, "Elastic constants determination and deformation observation using Brazilian disk geometry," presented at the XI International Congress and Exposition, Jun. 2-5, 2008, Experimental Mechanics, Sep. 1, 2010, 50(7):1025, 11 pages.
Luffel et al., "Matrix permeability measurement of gas productive shales," SPE-26633-MS, Society of Petroleum Engineers (SPE), presented at the 66th Annual Technical Conference and Exhibition, Oct. 3-6, 1993, 10 pages.
Ning et al., "The measurement of Matrix and Fracture Properties in Naturally Fractured Cores," SPE-25898, Society of Petroleum Engineers (SPE), presented at the SPE Rocky Mountain Regional/Low Permeability Reservoirs Symposium, Apr. 26-28, 1993, 15 pages.
Pollard and Fletcher, "Fundamentals of Structural Geology," Cambridge University Press, Sep. 1, 2005, 291, 1 page.

(56) References Cited

OTHER PUBLICATIONS

ResTech, "Development of laboratory and petrophysical techniques for evaluating shale reservoirs," GRI-95/0496, Gas Research Institute, Apr. 1996, 306 pages.

Rydzy et al., "Stressed Permeability in Shales: Effects of Matrix Compressibility and Fractures—A Step Towards Measuring Matrix Permeability in Fractured Shale Samples," SCA2016-027, presented at the International Symposium of the Society of Core Analysts held in Snowmass, Colorado, USA, Aug. 21-26, 2016, 12 pages.

Shafer et al., "Protocols for Calibrating NMR Log-Derived Permeabilities," International Symposium of the Society of Core Analysts, Aug. 21, 2005, 15 pages.

Thomas et al., "Fractured reservoir simulation," SPE-9305-PA, Society of Petroleum Engineers (SPE), SPE Journal, 23:1, Feb. 1983, 13 pages.

Timur, "Effective Porosity and Permeability of Sandstones Investigated Through Nuclear Magnetic Resonance Principles," Society of Petrophysicists and Well-Log Analysts, presented at the SPWLA 9th Annual Logging Symposium, Jun. 23-26, 1968, 18 pages.

Trimmer et al., "Effect of pressure and stress on the water transport in intact and fractured gabbro and granite," Journal of Geophysical Research, 85, Dec. 10, 1980, 13 pages.

Wang et al., "The Flattened Brazilian Disc Specimen Used for Testing Elastic Modulus, Tensile Strength and Fracture Toughness of Brittle Rocks: Analytical and Numerical Results," Int J Rock Mech Min Sci 41(2): 245-253, 9 pages.

Warren and Root, "The behavior of naturally fractured reservoirs," SPE-426-PA, Society of Petroleum Engineers (SPE), SPE Journal, 3:3, Sep. 1963, 11 pages.

Waters, "Frac Fluids on Organic Shales: What We Know, What We Don't, and What Can We Do About It," Society of Petroleum Engineers (SPE) Asia Pacific Hydraulic Fracturing Conference, Aug. 24-26, 2016, Beijing, China, 29 pages.

Yaich et al.; "A Case Study: The Impact of Soaking on Well Performance in the Marcellus," SPE-178614-MS, URTeC: 2154766, Society of Petroleum Engineers (SPE), Unconventional Resources Technology Conference (URTeC), presented at the Unconventional Resources Technology Conference, Jul. 20-22, 2015, 11 pages.

Yamada and Jones, "A review of pulse technique for permeability measurements," SPE Journal, 20:5, Oct. 1980, 2 pages.

Yan et al., "General multi-porosity simulation for fractured reservoir modeling," Journal of Natural Gas Science Engineering, 33, Jul. 2016, 16 pages.

PCT International Search Report and Written Opinion in International Appln. No. PCT/US2021/046913, dated Dec. 7, 2021, 15 pages.

\* cited by examiner

DETERMINING MATRIX PERMEABILITY OF SUBSURFACE FORMATIONS

TECHNICAL FIELD

The present disclosure relates to characteristics of subsurface formations, particularly to matrix permeability of subsurface formations.

BACKGROUND

One of the most important parameters for characterizing unconventional or source-rock reservoirs is permeability. The permeability includes: fracture permeability and matrix permeability. Fracture permeability characterizes the ease with which fluid can flow through the natural fractures in the rock, as well as those fractures created through hydrofracturing. Matrix permeability characterizes the ease with which a fluid can flow within the intact portion of the rock. Fracture permeability usually falls within the millidarcy (mD) range, whereas matrix permeability is in the microdarcy (µD) to nanodarcy (nD) range. Although matrix permeability is much lower than fracture permeability, under some circumstances matrix permeability may control the production of a rock reservoir.

Unconventional rocks are highly laminated, and many weakness planes can exist approximately parallel to the lamination due to the orientation of mineral components and distribution of pores and organic matters. When rock samples are retrieved to the earth surface from a reservoir, the rock samples tend to have more fractures due to the removal of the overburden pressure. Fractures generated through this process are called induced fractures relative to in situ fractures existing in rocks naturally. Thus, measuring matrix permeability of reservoir rocks can be challenging due to the presence of artificially generated fractures and microfractures.

SUMMARY

The present specification describes methods, apparatus, and systems for determining matrix permeability of subsurface formations, e.g., fractured reservoir rocks.

One aspect of the present disclosure features a method of determining permeability of a subsurface formation, including: positioning a sample of the subsurface formation in a measurement cell, fluidly connecting an inlet and an outlet of the sample to an upstream reservoir and a downstream reservoir, respectively, flowing a fluid through the sample from the upstream reservoir to the downstream reservoir, measuring changes of an upstream pressure associated with the upstream reservoir and a downstream pressure associated with the downstream reservoir in a measurement time period, and determining a matrix permeability of the subsurface formation based on measurement data before the upstream pressure and the downstream pressure merge at a merging time point.

The subsurface formation can include at least one of shale, limestone, siltstone, or sandstone. The fluid can include one or more gases from a group of gases including methane, argon, nitrogen, carbon dioxide, helium, ethane, and propane.

In some implementations, determining the matrix permeability of the subsurface formation includes: determining an initial time point when the upstream pressure and the downstream pressure are larger than a central pressure at an axial center of the sample, e.g., the middle point of the axis of a cylindrical sample, extracting measurement data within a particular time range from the initial time point to an ending time point, and determining the matrix permeability of the subsurface formation using the extracted measurement data within the particular time range. The initial time point is earlier than the merging time point. The ending time point can be earlier than the merging time point. The ending time point can be later than the merging time point.

In some examples, determining the initial time point includes: determining the initial time point to be a time point no earlier than a declining time point when both the upstream pressure and the downstream pressure start to decline.

In some examples, determining the starting time point includes: determining the central pressure at the axial center of the sample using the upstream pressure and the downstream pressure according to a formula:

$$P_{ms} = -\left(\frac{V_{ur}}{V_p}\frac{3}{2} + \frac{1}{4}\right)P_{ur} - \left(\frac{V_{dr}}{V_p}\frac{3}{2} + \frac{1}{4}\right)P_{dr} + \frac{3}{2}\left(\frac{V_p + V_{ur} + V_{dr}}{V_p}\right)P_\infty,$$

where $P_{ms}$, $P_{ur}$, and $P_{dr}$ represent the central pressure, the upstream pressure, and the downstream pressure, respectively, $V_{ur}$ and $V_{dr}$ represent volumes of the upstream reservoir and the downstream reservoir, respectively, $V_p$ represents a total volume of pores in the sample, and $P_\infty$ represents an equilibrium pressure at an end of the measurement time period when $P_{ur}$ and $P_{dr}$ are stable after merging.

In some implementations, determining the matrix permeability of the subsurface formation using the extracted measurement data within the particular time range includes: determining the matrix permeability based on data arrays $G(t)$ and $f(t)$ obtained from the extracted measurement data within the particular time range, where $$G(t) = \left(5AA + \frac{1}{2}\right)(P_{ur}(t) - P_{ur}(t_0)) + \left(5BB + \frac{1}{2}\right)(P_{dr}(t) - P_{dr}(t_0)),$$

and $$f(t) = \int_{t_0}^{\tau}\frac{1}{\mu \Phi C_g L^2}48\left(\left(AA + \frac{1}{2}\right)P_{ur} + \left(BB + \frac{1}{2}\right)P_{dr} - (1 + AA + BB)P_\infty\right)dt,$$

where $AA = V_{ur}/V_p$, $BB = V_{dr}/V_p$, $V_{ur}$ and $V_{dr}$ represent volumes of the upstream reservoir and the downstream reservoir, respectively, $V_p$ represents a total volume of pores in the sample, $t_0$ represents the initial time point, $t$ represents a time point within the particular time range, $\mu$ represents a viscosity of the fluid (e.g., a gas), $\Phi$ represents a porosity of the sample, $L$ represents a length of the sample, and $C_g$ represents a compressibility of the fluid (e.g., a gas), $P_{ur}$ and $P_{dr}$ represent the upstream pressure and the downstream pressure, respectively, and $P_\infty$ represents an equilibrium pressure at an end of the measurement time period when $P_{ur}$ and $P_{dr}$ are stable after $P_{ur}$ and $P_{dr}$ merge.

In some implementations, determining the matrix permeability based on the data arrays includes determining the matrix permeability according to a formula:

$$G(t) = -kf(t) + C,$$

where k represents the matrix permeability, and C represents a constant.

Determining the matrix permeability based on the data arrays can include: performing linear regression or linear fitting on the data arrays to get a slope, and determining the matrix permeability to be a negative of the slope.

In some implementations, the method can further include: before flowing the fluid through the sample, confining the measurement cell with a confining fluid to cause a confining pressure in the measurement cell where the confining fluid can be separated from the flowing fluid by one or more layers of sleeves, and applying an effective stress pressure to the sample, e.g., from all directions. Flowing the fluid through the sample can include: flowing the fluid to apply a pore pressure to the sample, where the pore pressure is smaller than the confining pressure. The method can further include: maintaining a pressure difference between the pore pressure and the confining pressure to be the effective stress pressure while flowing the fluid through the sample from the upstream reservoir to the downstream reservoir.

In some implementations, measuring the changes of the upstream pressure and the downstream pressure in the measurement time period includes: carrying out a pressure pulse decay permeability (PDP) measurement. The method can further include: preparing the sample of the subsurface formation by sealing a core plug sample of the subsurface formation with a sleeve. The method can also include: determining a fracture permeability of the subsurface formation based on the measurement data before the upstream pressure and the downstream pressure merge.

Another aspect of the present disclosure features a system for determining permeability of a subsurface formation. The system includes a measuring system and a computing system. The measuring system includes a measurement cell configured to contain a sample of the surface formation and upstream and downstream reservoirs fluidly connecting to an inlet and an outlet of the sample, respectively. The measuring system is configured to: flow a fluid through the sample from the upstream reservoir to the downstream reservoir, and measure changes of an upstream pressure associated with the upstream reservoir and a downstream pressure associated with the downstream reservoir in a measurement time period. The computing system is configured to determine a matrix permeability of the subsurface formation based on measurement data before the upstream pressure and the downstream pressure merge at a merging time point.

In some implementations, the computing system is separate from the measuring system. In some implementations, the measuring system includes the computing system.

In some implementations, the measuring system is configured to: before flowing the fluid through the sample, confine the measurement cell with a confining fluid to cause a confining pressure in the measurement cell where the confining fluid can be separated from the flowing fluid by one or more layers of sleeves, apply an effective stress pressure to the sample, e.g., from all directions, flow the fluid to apply a pore pressure to the sample, where the pore pressure is smaller than the confining pressure, and maintain a pressure difference between the confining pressure and the pore pressure to be the effective stress pressure while flowing the fluid through the sample from the upstream reservoir to the downstream reservoir. The measuring system can be configured to measure the changes of the upstream pressure and the downstream pressure in the measurement time period by carrying out a pressure pulse decay permeability (PDP) measurement.

In some implementations, the computing system is configured to: determine an initial time point when the upstream pressure and the downstream pressure are declining and are larger than a central pressure at an axial center of the sample (e.g., a middle point of the axis of the sample), extract measurement data within a particular time range from the initial time point to an ending time point, e.g., earlier or later than the merging time point, and determine the matrix permeability of the subsurface formation using the extracted measurement data within the particular time range.

In some examples, the computing system is configured to: determine data arrays $G(t)$ and $f(t)$ obtained from the extracted measurement data within the particular time range, where $$G(t) = \left(5AA + \frac{1}{2}\right)(P_{ur}(t) - P_{ur}(t_0)) + \left(5BB + \frac{1}{2}\right)(P_{dr}(t) - P_{dr}(t_0)),$$

and $$f(t) = \int_{t_0}^{t} \frac{1}{\mu \Phi C_g L^2} 48\left(\left(AA + \frac{1}{2}\right)P_{ur} + \left(BB + \frac{1}{2}\right)P_{dr} - (1 + AA + BB)P_\infty\right)dt;$$

and determine the matrix permeability based on the data arrays according to a formula:

$$G(t) = -kf(t) + C,$$

where k represents the matrix permeability, C represents a constant, $AA = V_{ur}/V_p$, $BB = V_{dr}/V_p$, $V_{ur}$ and $V_{dr}$ represent volumes of the upstream reservoir and the downstream reservoir, respectively, $V_p$ represents a total volume of pores in the sample, $t_0$ represents the initial time point, t represents a time point within the particular time range, $\mu$ represents gas viscosity, $\Phi$ represents a porosity of the sample, L represents a length of the sample, and $C_g$ represents gas compressibility, $P_{ur}$ and $P_{dr}$ represent the upstream pressure and the downstream pressure, respectively, and $P_\infty$ represents an equilibrium pressure at an end of the measurement time period when $P_{ur}$ and $P_{dr}$ are stable after $P_{ur}$ and $P_{dr}$ merge.

Implementations of the above techniques include methods, systems, computer program products and computer-readable media. In one example, a method can be performed by at least one processor coupled to at least one non-volatile memory and the methods can include the above-described actions. In another example, one such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above-described actions.

The details of one or more implementations of the subject matter of this specification are set forth in the accompanying drawings and associated description. Other features, aspects, and advantages of the subject matter will become apparent from the description, the drawings, and the claims.

DETAILED DESCRIPTION

Figure 1:
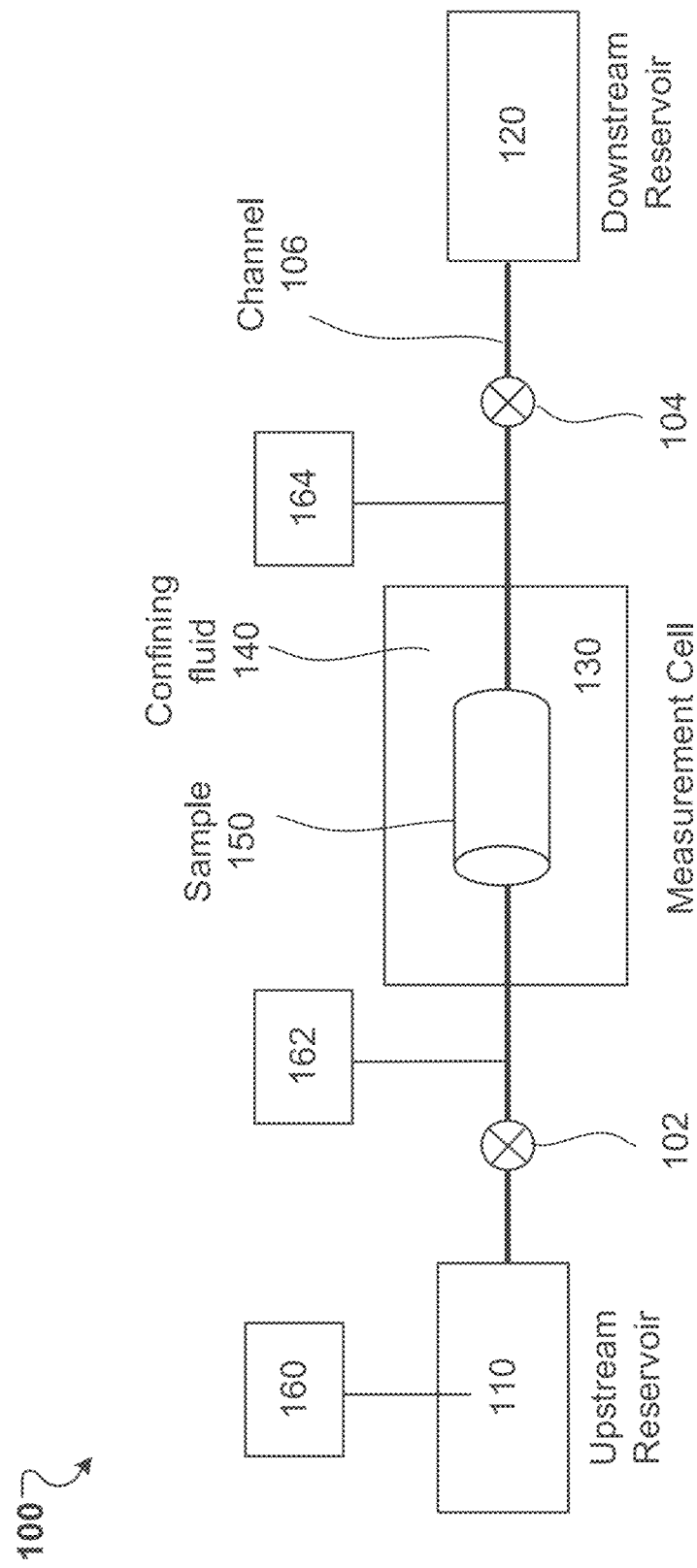
FIG. 1 is a schematic diagram illustrating an example system for determining matrix permeability of a subsurface formation, according to one or more example embodiments of the present disclosure.

As the presence of fractures may enlarge the permeability of a source rock sample with induced fractures, matrix permeability measurement results from a steady-state permeability (SSP) method and a transient pulse-decay permeability (PDP) method can be much larger than a true matrix permeability of reservoir rocks. The permeability thus measured hereinafter can be referred to fracture permeability.

In some cases, a Gas Research Institute (GRI) method resorts to crushing rocks such that the crushed particles are small enough so that no fractures cut into or cut through the particles and permeability from pressure decay on the particles represents the matrix permeability. However, the GRI method cannot measure permeability under different stress conditions. In some cases, a PDP method is applied to a single continuum sample, and measures fracture permeability if the sample is fractured and measures matrix permeability if the sample is not fractured.

In some cases, a modified PDP method measures both the fracture permeability and matrix permeability under different stress conditions from fractured unconventional rocks using data obtained from a late time period after the upstream pressure and downstream pressure merge into the same pressure for a given time. However, the sensitivity of the evolution of merged pressure measurements to matrix permeability may be not high. The merged pressure can change very slowly with time, which may also create problems for accurately measuring the rock matrix permeability in practice. The flow into the matrix may occur even before pressures merge.

Implementations of the present disclosure provide methods, systems and techniques for determining matrix permeability from fractured source rock samples using data obtained before upstream pressure and downstream pressure merge, which can resolve the above issues and provide quicker, higher sensitivity, and higher accuracy for measurements of matrix permeability.

In some implementations, for data analysis, a source rock sample is prepared. The sample can be represented into upstream and downstream halves along an axis of the sample. A pore pressure at a central of the sample can be calculated based on mass balance using pressures in upstream and downstream reservoirs and a final merged pressure. Pressure data after both the upstream pressure and downstream pressure decline but before the upstream pressure and downstream pressure merge can be obtained. Volume ratios between the volumes of the upstream and downstream reservoirs and the pore volume of the sample can be also obtained. Then, based on Darcy law and the summation of gas mass fluxes, two arrays G(t) and f(t) that are related by matrix permeability can be obtained. By performing linear regression or plotting, matrix permeability of the sample can be determined. The obtained matrix permeability can be used in reservoir simulation models to predict well productions from corresponding unconventional reservoirs.

The techniques can address existing challenges for measuring permeability of unconventional formations. For examples, the techniques can address a challenge of coring and core handling of heterogeneous rock samples that create extensive microcracking. The presence of these microcracks may directly affect the permeability measured, the lower the rock permeability, the greater the effect of the induced microcracks. This effect is most prevalent for laminated, low permeability, organic-rich, mudstones, where the organic to mineral contact and the interfaces associated with the laminated fabric are weak contacts that are prone to part during unloading. The methods implemented in the present disclosure are performed on source rock samples with induced fractures. The effect of the induced microcracks may be reduced or eliminated.

The techniques can also address the heterogeneity challenge in measuring permeability of unconventional formations, low permeability rocks. These rocks possess intrinsic variability in texture and composition that results from geologic processes of deposition and diagenesis. As a result, these rocks exhibit a broad distribution of permeabilities. Conventional permeability measurements developed for homogeneous media, have focused on the evaluation of a single representative value of permeability, without accounting for the distribution of permeabilities. The resulting consequences are that the "single permeability" is ill-defined and not necessarily representative of the rock containing the distribution of permeabilities. In comparison, the methods implemented in the present disclosure can be performed on multiple continua samples with induced fractures to get both fracture permeability and matrix permeability in the same measurement.

The techniques can also address the possibility of underestimating the matrix permeability, on samples of standard size, for example, 1 to 1.5 inches in diameter and 1 to 2 inches in length. The method using crushed fragments of sample tends to be the standard method most often used for measuring permeability in ultra-low permeability rocks. However, the measured permeabilities of the crushed sample fragments do not represent the mean value of the whole permeability distribution of the rock before it was crushed, unless a further calibration or correction is made to these measurements. If tiny fractures do exist in the reservoir conditions, crushing the rock to remove the effect of fractures and performing the permeability pressure decay measurements may generate much smaller permeability values then should be. In comparison, the methods implemented in the present disclosure can be performed with a whole plug sample with or likely with fractures or microfractures, instead of crushed samples having different particle size fractions. Thus, the data can be obtained at a high pore pressure (e.g., larger than 100 pounds per square inch—psi) and requires no or little corrections.

Example Measurement System

FIG. 1 illustrates an example system 100 for determining matrix permeability of a subsurface formation, according to one or more example embodiments of the present disclosure. The system 100 may include an upstream reservoir 110, a downstream reservoir 120, and a measurement cell 130 (or a core holder) connecting to the upstream and downstream reservoirs 110, 120 with valves 122, 124 through a fluidic channel 106 (e.g., a tube). The fluid in 110, 120, and 106 can be marked as a pore fluid.

The measurement cell 130 can be a vessel containing a confining fluid 140 (e.g., a gas or a liquid). The measurement cell 130 can be connected to a pump to control a confining pressure caused by the fluid 140 in the measurement cell 130. A sample 150 of subsurface formation can be placed in the measurement cell 130 and can be subject to the confining pressure. In some embodiments, the subsurface formation includes at least one of shale, limestone, siltstone, or sandstone. The confining fluid 140 and the pore fluid can be separated by one or more layers of sleeves surrounding the sample 150 and metal piece at the ends of the sample 150.

The upstream reservoir 110 and the downstream reservoir 120 can be fluid reservoirs and be connected to two different pumps to control pressures, respectively. The fluid (i.e., the pore fluid) can include one or more gases including at least one of methane, argon, nitrogen, carbon dioxide, helium, ethane, or propane. The pumps connected to the upstream reservoir 110 and the downstream reservoir 120 can include flow meters to measure mass flow rates at an inlet and outlet of the sample 150. A number of pressure and temperature transducers can be used to monitor pressure and temperature conditions at different locations in the system 100. For example, a pressure gauge 160 can be connected to the upstream reservoir 110, a pressure gauge 162 can be connected between the valve 122 and an inlet of the measurement cell 130, and a pressure gauge 164 can be connected between the value 124 and an outlet of the measurement cell 130.

The sample 150 may be fluidly connected to the supply of fluid from the upstream and downstream reservoirs 110, 120 via opposite ends of the sample 150, as shown in FIG. 1. In some examples, the sample 150 is a core plug sample of unconventional shale rock, e.g., a horizontal sample plug with a bedding parallel to an axis of a cylindrical shape of the sample 150. The sample 150 can be with one or more layers of sleeves for sealing. For example, the sample 150 can be wrapped in layers of plastic and metal sheet and put between two end pieces with metal lines to connect the sample 150 and the upstream and downstream reservoirs 110, 120 while keeping the sample 150 well-sealed.

Example Data Analysis Model

Figure 2A:
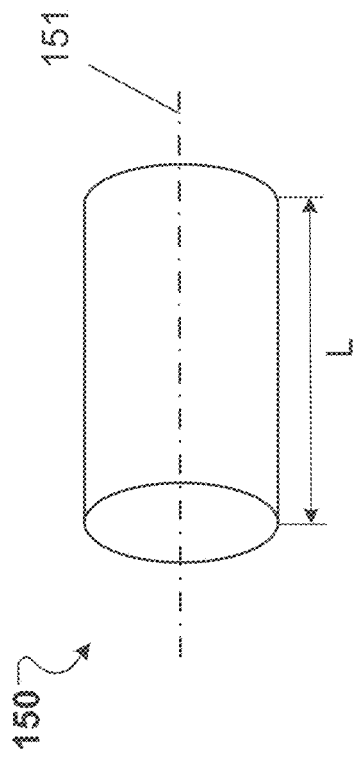
FIG. 2A illustrates a cylindrical core sample used in the systems and methods, according to one or more example embodiments of the present disclosure.
Figure 2B:
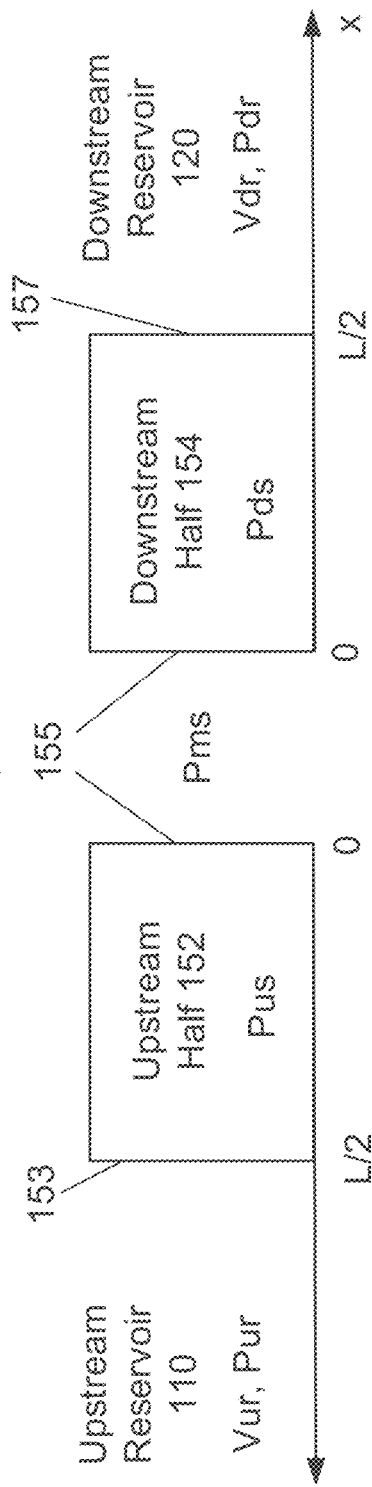
FIG. 2B illustrates a data analysis model for the sample of FIG. 2A, according to one example embodiment of the disclosure.

FIG. 2A illustrates a cylindrical core plug sample 150 used in the systems and methods, according to one or more example embodiments of the present disclosure. The sample 150 has a length L and a central axis 151. FIG. 2B illustrates a data analysis model 200 for the sample 150 of FIG. 2A, according to one or more example embodiments of the present disclosure.

The determination of rock matrix permeability can rely on analysis of measurement data with a relationship between the data and the permeability. As fluid flow in a rock sample is a one-dimensional process, the analysis of fluid mass flow for upstream side and downstream side of the sample can be done separately in one dimensional coordinate system shown in FIG. 2B. For illustration purposes only, gas is used as an example of the flowing fluid, i.e., the pore fluid. The data analysis is done on each half of the sample 150 (upstream half 152 and downstream half 154). The one dimensional system for both halves 152, 154 are shown with the original point (or center point) (i.e., x=0) at an axial center of the sample 150. x is a distance from the original point (x=0) to a position within the sample 150. For example, L/2 is the distance from the original point (or axial center 155) to end faces 153, 157 of the sample 150.

$P_{us}$ and $P_{ds}$ respectively represent pressures in the upstream half 152 and the downstream half 154 of the sample 150. The pressures at position x from the axial center (x=0) and time t can be expressed as $P_{us}(x,t)$ and $P_{ds}(x,t)$ for the upstream half 152 and the downstream half 154, respectively. For simplicity, $P_{us}(x,t)$ and $P_{ds}(x,t)$ are expressed as $P_{us}$ and $P_{ds}$, respectively. $P_{ms}$ represents the pressure at the axial center 155 of the sample 150, i.e., at the original point x=0. The gas density $\rho(x,t)$ is expressed as $\rho$. l is the half length of the sample 150 with the full length of L. x is in the range of (0, L/2) and z is defined as x/l. $V_p$ stands for a total volume of pores in the sample 150. A represents a cross-sectional area of the sample 150. $\Phi$ represents a porosity of the sample 150, which can be expressed as the fraction of the pore volume Vp relative to the total rock volume $V_{bulk}$ of the sample 150. That is, $V_{bulk}$=LA; and $$\phi = \frac{V_p}{V_{bulk}}.$$

$V_{ur}$ and $V_{dr}$ represent volumes of the upstream and downstream reservoirs 110, 120, respectively. $P_{ur}(t)$ and $P_{dr}(t)$ respectively represent pressures in the upstream reservoir 110 and the downstream reservoir 120, which are changing with time t and are expressed as $P_{ur}$ and $P_{dr}$, respectively.

At a particular time period, both the pressures $P_{ur}$ and $P_{dr}$ in the upstream and downstream reservoirs 110, 120 are larger than the pressure $P_{ms}$ in the center of the sample 150. Gas flows into the sample 150 from both the upstream reservoir 110 and the downstream reservoir 120. The pore volume $V_p$ of the sample 150 can be expressed as:

$$V_p = \Phi AL = 2\Phi Al \quad (1).$$

Considering that there can be an approximate quadratic distribution of pressure from the end surface 153, 157 of the sample to the center 155 of the sample 150, $P_{us}$ and $P_{ds}$ in the upstream half 152 and the downstream half 154 can be expressed as:

$$P_{us} = (P_{ur} - P_{ms})\left(\frac{x}{\frac{L}{2}}\right)^2 + P_{ms} = (P_{ur} - P_{ms})z^2 + P_{ms}, \quad (2)$$

$$P_{ds} = (P_{dr} - P_{ms})\left(\frac{x}{\frac{L}{2}}\right)^2 + P_{ms} = (P_{dr} - P_{ms})z^2 + P_{ms}. \quad (3)$$

A mass balance equation for either half 152, 154 of the sample can be written as:

$$\frac{\partial(\rho\Phi)}{\partial t} = -\frac{\partial q}{\partial x} = -\frac{\partial q}{\partial z}\frac{1}{l}, \quad (4)$$

where q is the gas mass flux. If the change of porosity c during the measurement can be neglected, there can be:

$$\frac{\partial(\rho_{us}\Phi)}{\partial t} = \Phi\frac{\partial\rho_{us}}{\partial t} = \Phi\frac{\partial\rho_{us}}{\partial P_{us}}\frac{\partial P_{us}}{\partial t} = \Phi\rho C_g\frac{\partial P_{us}}{\partial t} = \Phi\rho C_g\frac{d((P_{ur}-P_{ms})z^2+P_{ms})}{dt}, \tag{5}$$

$$\frac{\partial(\rho_{ds}\Phi)}{\partial t} = \Phi\frac{\partial\rho_{ds}}{\partial t} = \Phi\frac{\partial\rho_{ds}}{\partial P_{ds}}\frac{\partial P_{ds}}{\partial t} = \Phi\rho C_g\frac{\partial P_{ds}}{\partial t} = \Phi\rho C_g\frac{d((P_{dr}-P_{ms})z^2+P_{ms})}{dt}, \tag{6}$$

where $$\rho C_g = \frac{\partial \rho_{us}}{\partial P_{us}} = \frac{\partial \rho_{ds}}{\partial P_{ds}},$$

ρ represents a density of the pore fluid such as a gas, and $C_g$ represents a compressibility of the pore fluid such as a gas. By definition, $$C_g = \frac{\partial \rho}{\rho \partial P},$$

thus $$\rho C_g = \frac{\partial \rho}{\partial P}.$$

The total mass change Q1 in the sample 150 (including both halves 152, 154) can be expressed as:

$$Q1 = -\Phi\rho C_g lA \int_0^1 \frac{d((P_{dr}-P_{ms})z^2+P_{ms}+(P_{ur}-P_{ms})z^2+P_{ms})}{dt}dz = \\ -\frac{V_p}{2}\rho C_g\frac{d\left(\frac{4}{3}P_{ms}+\frac{1}{3}P_{ur}+\frac{1}{3}P_{dr}\right)}{dt}. \tag{7}$$

The total mass change Q2 in both upstream and downstream reservoirs 110, 120 can be expressed as:

$$Q2 = -V_{ur}\rho C_g\frac{dP_{ur}}{dt} - V_{dr}\rho C_g\frac{dP_{dr}}{dt}. \tag{8}$$

As a result of mass balance, Q2=−Q1, thus:

$$-V_{ur}\rho C_g\frac{dP_{ur}}{dt} - V_{dr}\rho C_g\frac{dP_{dr}}{dt} = \frac{V_p}{2}\rho C_g\frac{d\left(\frac{4}{3}P_{ms}+\frac{1}{3}P_{ur}+\frac{1}{3}P_{dr}\right)}{dt}. \tag{9}$$

Equation 9 can be integrated as:

$$V_{ur}P_{ur} - V_{dr}P_{dr} = V_p\left(\frac{4}{6}P_{ms}+\frac{1}{6}P_{ur}+\frac{1}{6}P_{dr}\right) + C. \tag{10}$$

When t=∞, $P_{ur}=P_{dr}=P_{ms}=P_\infty$, where $P_\infty$ is the pressure when t=∞ at the end of the measurement. Thus, C can be solved from Equation 10:

$$C = (-V_{ur}-V_{dr}-V_p)P_\infty. \tag{11}$$

Combining Equations 10 and 11 gives:

$$P_{ms} = -\left(\frac{V_{ur}}{V_p}\frac{3}{2}+\frac{1}{4}\right)P_{ur} - \left(\frac{V_{dr}}{V_p}\frac{3}{2}+\frac{1}{4}\right)P_{dr} + \frac{3}{2}\left(\frac{V_p+V_{ur}+V_{dr}}{V_p}\right)P_\infty. \tag{12}$$

From Equation 12, the following equation can be obtained:

$$\frac{dP_{ms}}{dt} = -\left(\frac{V_{ur}}{V_p}\frac{3}{2}+\frac{1}{4}\right)\frac{dP_{ur}}{dt} - \left(\frac{V_{dr}}{V_p}\frac{3}{2}+\frac{1}{4}\right)\frac{dP_{dr}}{dt}. \tag{13}$$

Based on the mass balance, the summation of gas mass fluxes at positions x is given in the following equation:

$$q1 = -\int_0^x \frac{\partial(\rho_{us}\Phi)}{\partial t}dx - \int_0^x \frac{\partial(\rho_{ds}\Phi)}{\partial t}dx. \tag{14}$$

Note that there are an x position in the upstream half 152 of the sample 150 and also an x position in the downstream half 154 of the sample 150, as illustrated in FIG. 2B.

Inserting Equations 5 and 6 into Equation 14 results in:

$$q1 = -\Phi\rho C_g l\left(2z\frac{dP_{ms}}{dt}+\frac{1}{3}z^3\left(\frac{dP_{ur}}{dt}-\frac{dP_{mr}}{dt}\right)+\frac{1}{3}z^3\left(\frac{dP_{dr}}{dt}-\frac{dP_{mr}}{dt}\right)\right). \tag{15}$$

Based on Darcy law, the summation of the gas flow fluxes can also be expressed as:

$$q2 = -k\frac{\rho}{\mu}\frac{\partial P_{us}}{\partial z}\frac{1}{l} - k\frac{\rho}{\mu}\frac{\partial P_{ds}}{\partial z}\frac{1}{l}, \tag{16}$$

where k represents the matrix permeability and μ represents gas viscosity.

Based on q2=q1 and Equations 15 and 16, the following equation can be obtained:

$$k\frac{1}{\mu}\frac{\partial P_{us}}{\partial z}\frac{1}{l}\frac{1}{\Phi C_g l} + k\frac{1}{\mu}\frac{\partial P_{ds}}{\partial z}\frac{1}{l}\frac{1}{\Phi C_g l} = \\ 2z\frac{dp_{ms}}{dt}+\frac{1}{3}z^3\left(\frac{dp_{ur}}{dt}-\frac{dp_{ms}}{dt}\right)+\frac{1}{3}z^3\left(\frac{dp_{dr}}{dt}-\frac{dp_{ms}}{dt}\right). \tag{17}$$

Integrating the above equation 17 on z from 0 to 1 results in $$\frac{k}{\mu \Phi C_g L^2} 48 \left( \left( AA + \frac{1}{2} \right) P_{ur} + \left( BB + \frac{1}{2} \right) P_{dr} - (1 + AA + BB) P_\infty \right) = \quad (18)$$

$$-\left( 5AA + \frac{1}{2} \right) \frac{dP_{ur}}{dt} - \left( 5BB + \frac{1}{2} \right) \frac{dP_{dr}}{dt},$$

where $AA = V_{ur}/V_p$, and $BB = V_{dr}/V_p$.

Integrating both sides of the above equation 18 from $t_0$ to t gives $$G(t) = -kf(t) + \text{contestant} \quad (19),$$

$$G(t) = \left( 5AA + \frac{1}{2} \right)(P_{ur}(t) - P_{ur}(t_0)) + \left( 5BB + \frac{1}{2} \right)(P_{dr}(t) - P_{dr}(t_0)), \quad (20)$$

$$f(t) = \quad (21)$$

$$\int_{t_0}^{\tau} \frac{1}{\mu \Phi C_g L^2} 48 \left( \left( AA + \frac{1}{2} \right) P_{ur} + \left( BB + \frac{1}{2} \right) P_{dr} - (1 + AA + BB) P_\infty \right) dt.$$

In Equations 20 and 21, $t_0$ is a time before pressures $P_{ur}$ and $P_{dr}$ in both the upstream and downstream reservoirs 110 and 120 start to merge. Equations 19, 20 and 21 can be used for determining the matrix permeability k with measurement observations. An algorithm can be developed to evaluate G(t) and f(t) and then to determine the matrix permeability k.

Example Measurement of Matrix Permeability

Measurement of matrix permeability of a source rock (e.g., carbonate rock) sample can be performed using a measurement system, e.g., the measurement system 100 of FIG. 1. The source rock sample can have fractures. The measurement system can include a processor configured to process measurement data to determine the matrix permeability.

First, a core sample, e.g., the sample 150 of FIGS. 1, 2A and 2B, is collected and prepared. The core sample can have a cylindrical shape. A dimension of the core sample can be measured and recorded. The dimension can include a length L of the core sample and a cross-sectional area A of the sample. The core sample can be sealed, e.g., with one or more layers of sleeves. For example, the core sample can be wrapped in layers of plastic and metal sheet and put between two end pieces with metal lines to connect the sample and upstream and downstream reservoirs, e.g., the reservoirs 110, 120 of FIGS. 1 and 2B.

Second, measurement on the core sample is performed. The core sample is loaded into a core holder or a measurement cell, e.g., the measurement cell 130 of FIG. 1. A confining pump can be used to introduce distilled water as a confining fluid, e.g., the fluid 140 of FIG. 1, into the measurement cell. Once the measurement cell is full, the confining pump continues to flow the distilled water into the measurement cell to ensure that there is no gas remaining inside the measurement cell. After the confining of the measurement cell is locked in, an effective stress pressure (e.g., a pressure difference between a confining pressure and a pore pressure) is immediately applied to the core sample to reduce the possibility of water leakage into the sleeve of the core sample. The effective stress pressure can be about 500 psi. After this step, the pore pressure and the confining pressure can be adjusted to the desired values.

Both upstream and downstream pumps that are connected to the core sample through upstream and downstream reservoirs, e.g., the reservoirs 110 and 120 of FIG. 1, are used to slowly impose a pore pressure to the core sample. The gas is allowed to flow through the sample from the upstream gas reservoir to the downstream gas reservoir. The pore pressure can be about 2,500 psi. The use of the pore pressure is to minimize the impact of diffusion on permeability measurements. As the gas from the upstream and downstream reservoirs is introduced into the core sample, the confining pressure in the measurement cell is increased simultaneously to maintain a pressure difference between the confining pressure and the pore pressure. The pressure difference can be the effective stress pressure, e.g., 500 psi. Once the confining pump and the upstream and downstream pumps are stable at a desired pressure, the core sample is isolated by closing the valves 102 and 104. A pressure pulse can be applied in the upstream reservoir 110. By opening the valve 102, a pressure pulse decay permeability (PDP) measurement can be carried out.

During an early stage of the pressure pulse decay measurement on the core sample with fractures, the gas mainly flows within the fractures until the pressures in the upstream and downstream gas reservoirs become practically the same value. Once upstream and downstream reservoir pressures become the same, the pressure within the system including upstream reservoir, downstream reservoir and fracture reach equilibrium. After this time (referred to as a pressure merging point), flow in fractures essentially stops because of zero pressure gradient, but flow still occurs from gas reservoirs into the rock matrix, resulting in further pressure decline.

Figure 3A:
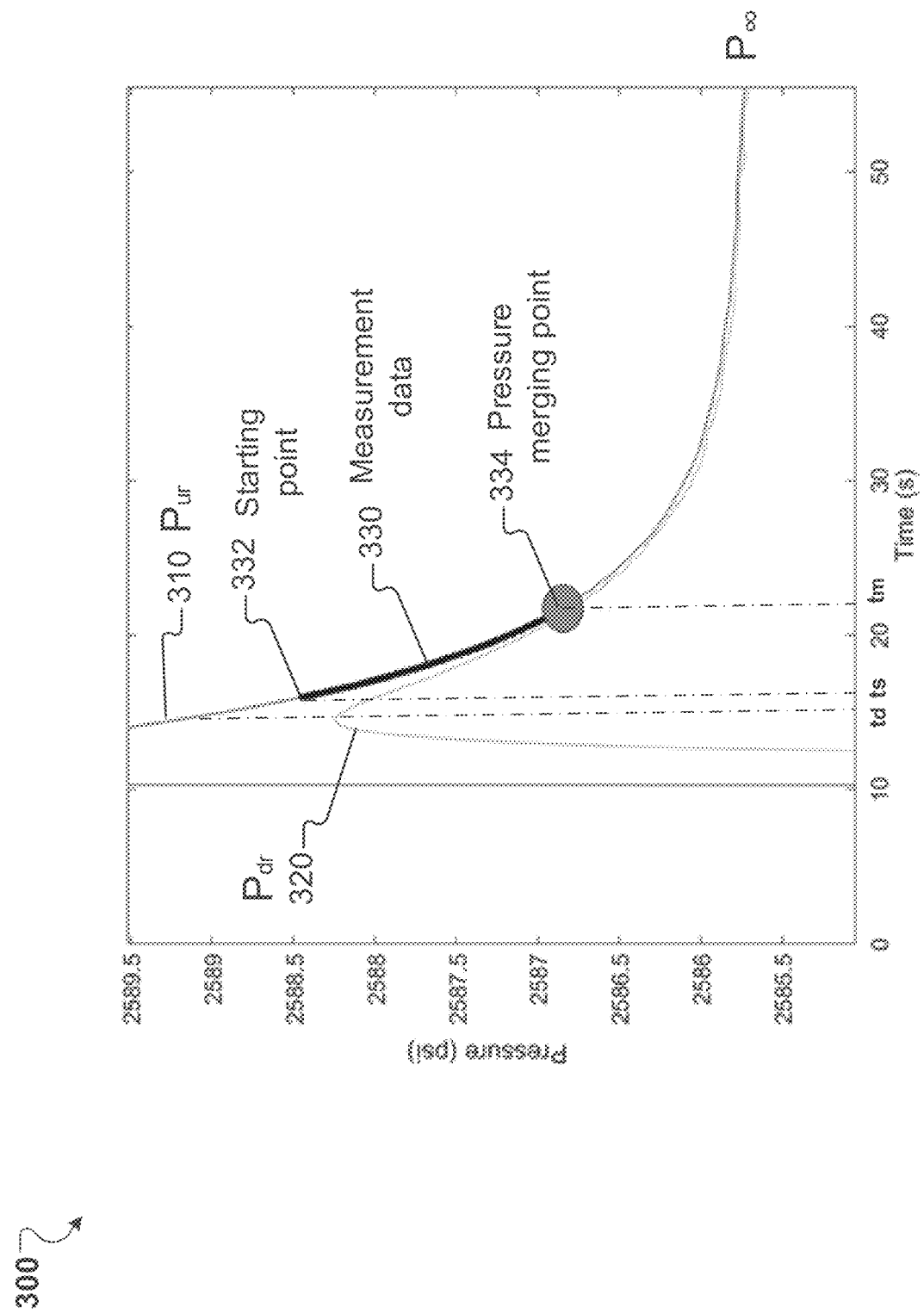
FIG. 3A shows a diagram illustrating transient pressures in upstream and downstream sides of a sample during an example measurement, according to one or more example embodiments of the present disclosure.

FIG. 3A is a diagram 300 showing changes of pressures $P_{ur}$ and $P_{dr}$ of upstream and downstream reservoirs with time during an example measurement. Plot 310 shows the change of pressure $P_{ur}$ with time, and plot 320 shows the change of pressure $P_{ur}$ with time. As shown in FIG. 3A, starting from a pressure declining point $t_d$ (about 15 second), both $P_{ur}$ and $P_{dr}$ start to decline, indicating that the transport from the upstream and downstream gas reservoirs to an interior of the core sample is the dominant process while gas is still being transported from the upstream gas reservoir to the downstream reservoir. At a pressure merging point $t_m$ 334 (e.g., about 21 second), $P_{ur}$ and $P_{dr}$ merge to have the same pressure. $P_{ur}$ and $P_{dr}$ continue to decline until the measurement concludes, e.g., at about 55 second, when there is no pressure drop, i.e., $P_{ur} = P_{dr} = P_\infty$.

A time period can be selected within a time range from the pressure declining point $t_d$ to the pressure merging point $t_m$, and measurement data in the time period can be used to determine matrix permeability of the core sample. For example, as illustrated in FIG. 3, measurement data 330 within a time period from a starting point $t_s$ 332 to the pressure merging point $t_m$ 334 can be extracted to determine the matrix permeability of the core sample.

Third, matrix permeability of the sample is determined based on the measurement data extracted before the upstream and downstream reservoir pressures merge. Pressure $P_{ms}$, at an axial center of the core sample can be calculated according to Equation 12 using the data $P_{ur}$, $P_{dr}$, and $$P_\infty: P_{ms} = -\left(\frac{V_{ur}}{V_p}\frac{3}{2}+\frac{1}{4}\right)P_{ur} - \left(\frac{V_{dr}}{V_p}\frac{3}{2}+\frac{1}{4}\right)P_{dr} + \frac{3}{2}\left(\frac{V_p+V_{ur}+V_{dr}}{V_p}\right)P_\infty.$$

Volume ratios AA and BB are also calculated as follows: $AA=V_{ur}/V_p$ and $BB=V_{dr}/V_p$.

An initial time point $t_0$ is selected from the extracted time period $[t_s, t_m)$, where $p_{ur} > p_{ms}$ and $P_{dr} > p_{ms}$. The initial time point $t_0$ can be the starting point $t_s$, but not the merging point $t_m$. Two arrays G(t) and f(t) that change with time t can be constructed according to Equations 20 and 21:

$$G(t) = \left(5AA + \frac{1}{2}\right)(P_{ur}(t) - P_{ur}(t_0)) + \left(5BB + \frac{1}{2}\right)(P_{dr}(t) - P_{dr}(t_0)),$$

and $$f(t) = \int_{t_0}^{t} \frac{1}{\mu \Phi C_g L^2} 48\left(\left(AA + \frac{1}{2}\right)P_{ur} + \left(BB + \frac{1}{2}\right)P_{dr} - (1+AA+BB)P_\infty\right)dt.$$

Figure 3B:
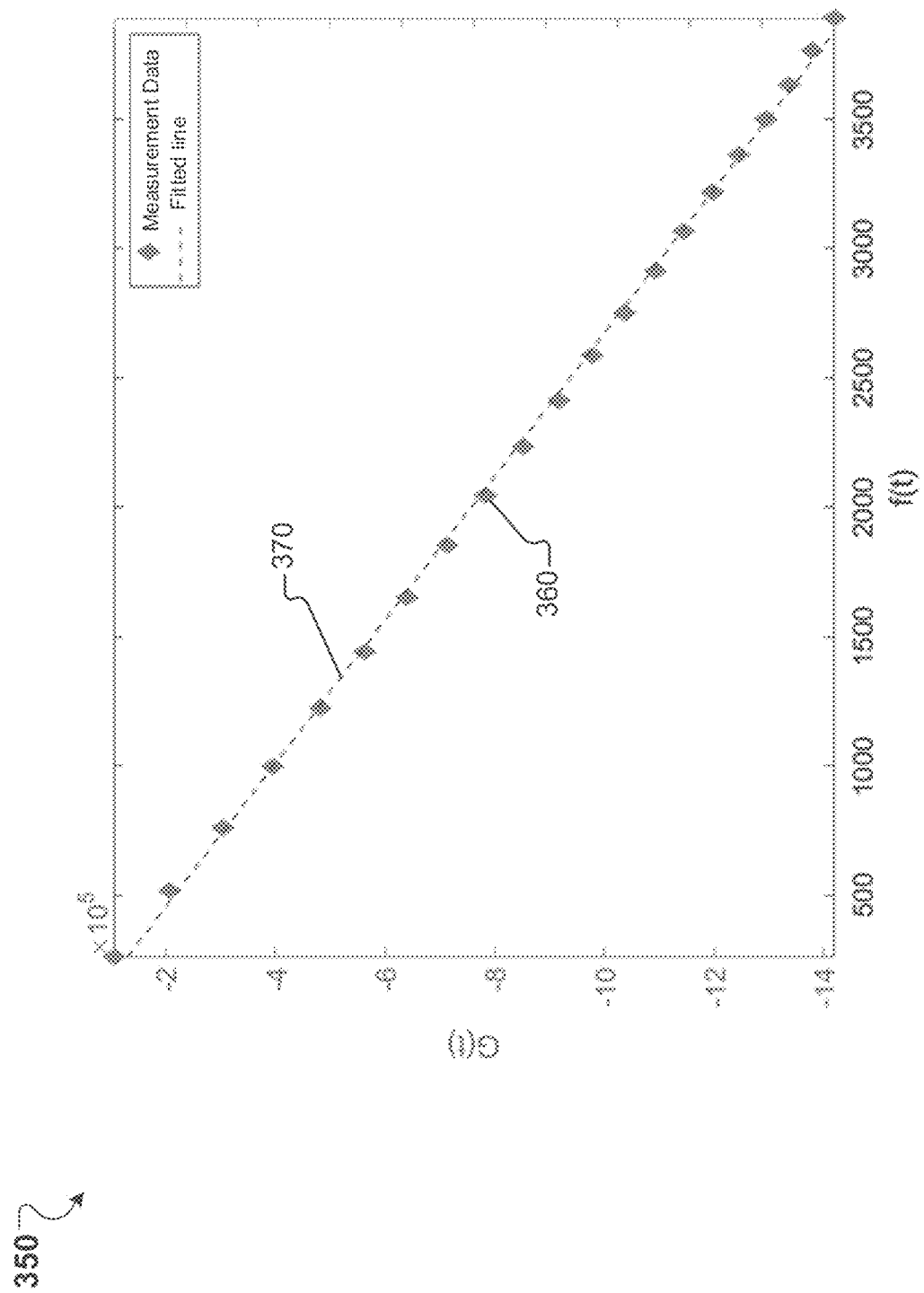
FIG. 3B shows a plot between data arrays G(t) and f(t) based on data selected from the measurement data of FIG. 3A before the upstream pressure and the downstream pressure merge, according to one or more example embodiments of the present disclosure.

The matrix permeability k is determined based on the two arrays G(t) and f(t) according to Equation 19: G(t)=−k f(t)+constant. In some examples, linear regression is performed on the two arrays G(t) and f(t) to get the slope −k, that is the negative of the matrix permeability. In some examples, f(t) and G(t) are plotted. The matrix permeability is determined from the slope −k. FIG. 3B is a diagram 350 showing the plot between f(t) and G(t) based on measurement data 360 selected from the measurement data 330 of FIG. 3A. It is shown that the two arrays f(t) and G(t) have a linear relationship which can be fitted by a fitted line 370. The slope of the fitted line 370 is −k. Thus, the matrix permeability k of the core sample can be determined from the slope, e.g., 360 nD.

The fracture permeability of the core sample can be also determined using the measurement data 330 of FIG. 3A. The fracture permeability can be obtained using the formula:

$$P_{ur}(t) - P_{dr}(t) = f(\phi, L, A, V_{bulk}, c, \mu, V_p, V_{ur}, V_{dr}, k, t) \quad (22),$$

where $P_{ur}(t)$ is the pressure of the upstream side, $P_{dr}(t)$ is the pressure downstream side, t is time, k the fracture permeability, $\phi$ the sample's total porosity, L is the sample length, and A is the cross section area of the sample, $V_{bulk}$ the bulk volume of the sample ($V_{bulk}$=LA; and $$\phi = \frac{V_p}{V_{bulk}}),$$

c is the compressibility of the fluid, $\mu$ is the gas viscosity, $V_p$ the pore volume of the sample, $V_{ur}$ is the upstream reservoir volume, and $V_{dr}$ is the downstream reservoir volume. Thus, within the same measurement, both matrix permeability and fracture permeability of the core sample can be obtained. The obtained permeability values can be used in reservoir simulation models to predict well productions from the corresponding unconventional reservoirs.

Example Process

Figure 4:
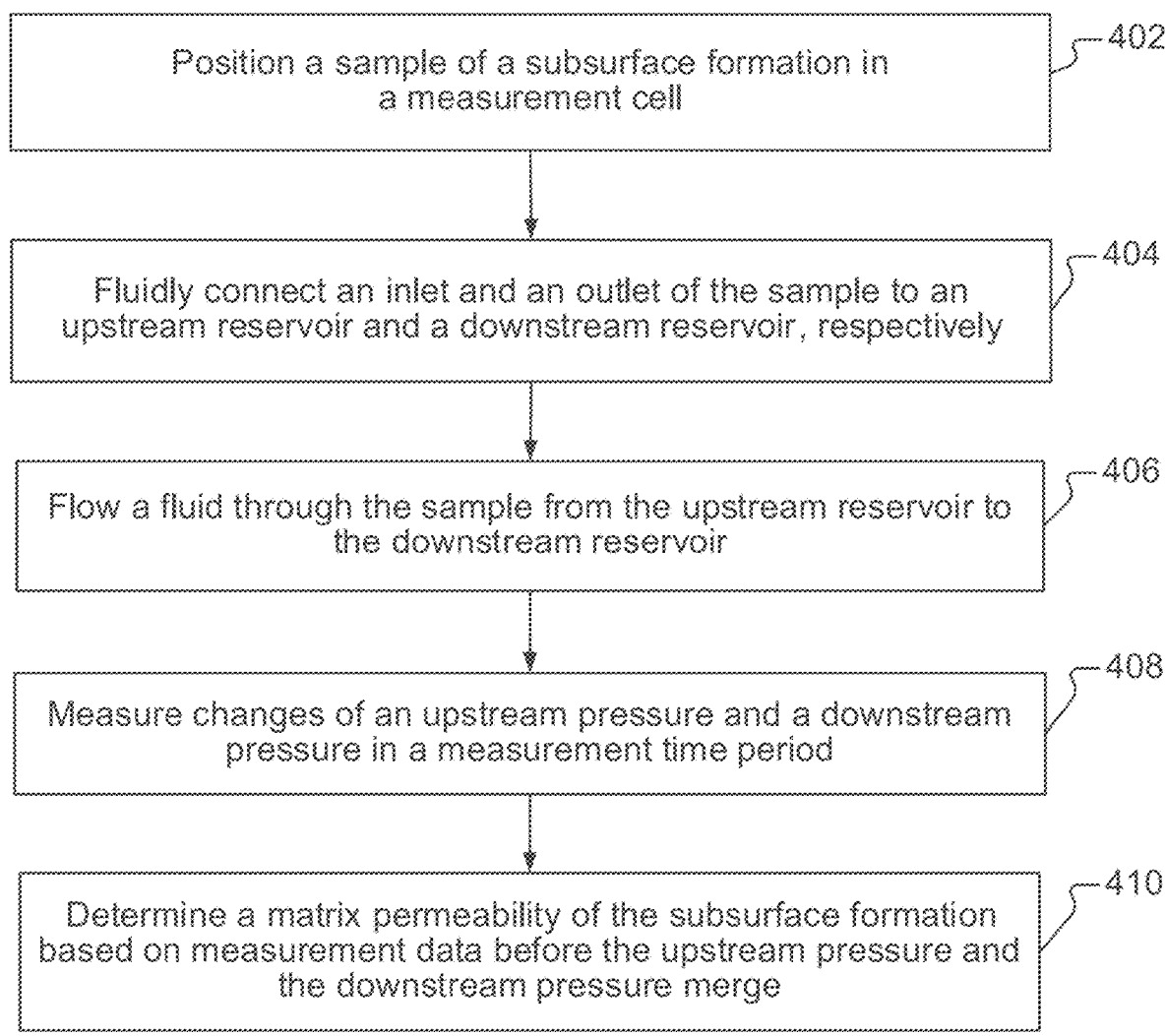
FIG. 4 is a flowchart of an example process of determining a matrix permeability of a subsurface formation, according to one or more example embodiments of the present disclosure.

FIG. 4 is a flowchart of an example process 400 of determining matrix permeability of a subsurface formation. The process 400 can be performed by a system including a measurement system, e.g., the measurement system 100 of FIG. 1, and a computing system. In some implementations, the computing system is separate from the measurement system. In some implementations, the measurement system includes the computing system. The computing system can include at least one processor, and at least one non-transitory machine readable storage medium coupled to the at least one processor having machine-executable instructions stored thereon that, when executed by the at least one processor, cause the at least one processor to perform one or more operations.

At 402, a sample of the subsurface formation is positioned in a measurement cell of the measurement system. The subsurface formation can include at least one of shale, limestone, siltstone, or sandstone. The sample of the subsurface formation can be a fractured sample. The sample can be prepared using the subsurface formation. For example, the sample can be prepared to be a core plug sample, e.g., the sample 150 of FIGS. 1, 2A and 2B. The sample can be sleeved so that the sample can be sealed. For example, the core sample can be wrapped in layers of plastic and metal sheet and put between two end pieces with metal lines. The core sample can have a cylindrical shape. A dimension of the core sample can be measured and recorded. The dimension can include a length L of the core sample and a cross-sectional area A of the sample. The measurement cell can be the measurement cell 130 of FIG. 1.

At 404, an inlet and an outlet of the sample are fluidly connected to an upstream reservoir and a downstream reservoir, respectively. The upstream reservoir and the downstream reservoir can be the upstream reservoir 110 and the downstream reservoir 120 of FIG. 1.

A confining pump can be used to introduce a confining fluid, e.g., water, into the measurement cell. Once the measurement cell is full, the confining pump continues to flow the confining fluid into the measurement cell to ensure that there is no gas remaining inside the measurement cell. After the confining of the measurement cell is locked in, an effective stress pressure is immediately applied to the sample, e.g., from all directions of the sample, to reduce the possibility of water leakage into the sleeve of the core sample. The effective stress pressure can be about 500 psi. After the effective stress pressure is applied, a pore pressure and a confining pressure can be adjusted to any desired values.

At 406, a fluid is flowed through the sample from the upstream reservoir to the downstream reservoir. The fluid can include one or more gases from a group of gases including methane, argon, nitrogen, carbon dioxide, helium, ethane, and propane. Both upstream and downstream pumps that are connected to the sample through the upstream and downstream reservoirs can be used to slowly impose a pore pressure to the core sample. The pore pressure can be smaller than the confining pressure The pore pressure can be about 2,500 psi. The use of the pore pressure is to minimize the impact of diffusion on permeability measurements. As the gas from the upstream and downstream reservoirs is introduced into the core sample, the confining pressure in the measurement cell is increased simultaneously to maintain a pressure difference between the confining pressure and the pore pressure to be the effective stress pressure. Once the confining pump and the upstream and downstream pumps are stable at a desired pressure, a pressure pulse decay permeability (PDP) measurement can be carried out.

At 408, changes of an upstream pressure and a downstream pressure in a measurement time period are measured. The upstream pressure can be associated with the upstream reservoir. In some examples, the upstream pressure can be a pressure in the upstream reservoir, which can be measured by a pressure gauge, e.g., the pressure gauge 160, that is inserted into the upstream reservoir. In some examples, the upstream pressure can be a pressure before an inlet of the sample measured by a pressure gauge, e.g., the pressure gauge 162 between the valve 102 and the inlet of the sample of FIG. 1. The downstream pressure can be associated with the downstream reservoir. In some examples, the downstream pressure can be a pressure after the outlet of the sample measured by a pressure gauge, e.g., the pressure gauge 164 after the outlet of the sample before the valve 104 of FIG. 1.

The upstream pressure and the downstream pressure can be measured by carrying out a pressure pulse decay permeability (PDP) measurement. The measurement data shows changes of the upstream pressure and the downstream pressure in the measurement time period, as illustrated in FIG. 3A.

At 410, the matrix permeability of the subsurface formation is determined based on measurement data before the upstream pressure and the downstream pressure merge at a merging time point. The computing system can process the measurement data to determine the matrix permeability of the subsurface formation.

The computing system can determine an initial time point when the upstream pressure and the downstream pressure are larger than a central pressure at an axial center of the sample. The initial time point can be a time point no earlier than a declining time point when both the upstream pressure and the downstream pressure start to decline, e.g., the declining time point td of FIG. 3A. The computing system can determine the central pressure at the axial center of the sample using the upstream pressure and the downstream pressure according to a formula:

$$P_{ms} = -\left(\frac{V_{ur}}{V_p}\frac{3}{2} + \frac{1}{4}\right)P_{ur} - \left(\frac{V_{dr}}{V_p}\frac{3}{2} + \frac{1}{4}\right)P_{dr} + \frac{3}{2}\left(\frac{V_p + V_{ur} + V_{dr}}{V_p}\right)P_\infty,$$

where $P_{ms}$, $P_{ur}$, and $P_{dr}$ represent the central pressure, the upstream pressure, the downstream pressure, respectively, $V_{ur}$ and $V_{dr}$ represent volumes of the upstream reservoir and the downstream reservoir, respectively, $V_p$ represents a total volume of pores in the sample, and $P_\infty$ represents an equilibrium pressure at an end of the measurement time period when $P_{ur}$ and $P_{dr}$ are stable.

The computing system can extract measurement data within a particular time range from the initial time point to an ending time point no later than the merging time point, e.g., the measurement data 330 of FIG. 3A, and determine the matrix permeability of the subsurface formation using the extracted measurement data within the particular time range. In some examples, the computing system can determine determining the matrix permeability based on data arrays G(t) and f(t) obtained from the extracted measurement data within the particular time range, where:

$$G(t) = \left(5AA + \frac{1}{2}\right)(P_{ur}(t) - P_{ur}(t_0)) + \left(5BB + \frac{1}{2}\right)(P_{dr}(t) - P_{dr}(t_0)),$$

and $$f(t) = \int_{t_0}^{t} \frac{1}{\mu \Phi C_g L^2} 48\left(\left(AA + \frac{1}{2}\right)P_{ur} + \left(BB + \frac{1}{2}\right)P_{dr} - (1 + AA + BB)P_\infty\right)dt,$$

where $AA = V_{ur}/V_p$, $BB = V_{dr}/V_p$, $V_{ur}$ and $V_{dr}$ represent volumes of the upstream reservoir and the downstream reservoir, respectively, $V_p$ represents a total volume of pores in the sample, $t_0$ represents the starting time point, t represents a time point within the particular time range, μ represents a viscosity of the fluid, Φ represents a porosity of the sample, L represents a length of the sample, and $C_g$ represents a compressibility of the fluid, $P_{ur}$ and $P_{dr}$ represent the upstream pressure and the downstream pressure, respectively, and $P_\infty$ represents an equilibrium pressure at an end of the measurement time period when $P_{ur}$ and $P_{dr}$ are stable after $P_{ur}$ and $P_{dr}$ merge.

The computing system can determine the matrix permeability based on the data arrays permeability according to a formula:

$$G(t) = -kf(t) + C,$$

where k represents the matrix permeability, and C represents a constant. The formula can be derived based on mass balance and Darcy law. Then the computing system can perform linear regression or linear fitting on the data arrays to get a slope and determine the matrix permeability to be a negative of the slope.

In some cases, the computing system can further determine a fracture permeability of the subsurface formation based on the measurement data before the upstream pressure and the downstream pressure merge. Thus, within the same measurement, both matrix permeability and fracture permeability of the core sample can be obtained. The obtained permeability values can be used in reservoir simulation models to predict well productions from the corresponding unconventional reservoirs.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, such as, one or more modules of computer program instructions encoded on a tangible, non-transitory computer-storage medium for execution by, or to control the operation of, data processing apparatus. Alternatively or in addition, the program instructions can be encoded on an artificially generated propagated signal, such as, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus and special purpose logic circuitry may be hardware-based and software-based. The apparatus can optionally include code that creates an execution environment for computer programs, for example, code that constitutes processor firmware, a protocol stack, a database management system, an operating system, or a combination of one or more of them. The present specification contemplates the use of data processing apparatuses with or without conventional operating systems.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD-R, DVD-RAM, and DVD-ROM disks. The memory may store various objects or data, including caches, classes, frameworks, applications, backup data, jobs, web pages, web page templates, database tables, repositories storing business and dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include multiple user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a web browser through which a user can interact with an implementation of the subject matter described in this specification, or any combination of one or more such back-end, middleware, or front-end components. The components of the system can be interconnected by any form or medium of wireline or wireless digital data communication, for example, a communication network. Examples of communication networks include a local area network (LAN), a radio access network (RAN), a metropolitan area network (MAN), a wide area network (WAN), worldwide interoperability for microwave access (WIMAX), a wireless local area network (WLAN) using, for example, 902.11 a/b/g/n and 902.20, all or a portion of the Internet, and any other communication system or systems at one or more locations. The network may communicate with, for example, internet protocol (IP) packets, frame relay frames, asynchronous transfer mode (ATM) cells, voice, video, data, or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and software, may interface with each other or the interface using an application programming interface (API) or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in any suitable language providing data in any suitable format. The API and service layer may be an integral or a stand-alone component in relation to other components of the computing system. Moreover, any or all parts of the service layer may be implemented as child or sub-modules of another software module, enterprise application, or hardware module without departing from the scope of this specification.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing may be advantageous and performed as deemed appropriate.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier provided description of example implementations does not define or constrain this specification. Other changes, substitutions, and alterations are also possible without departing from the spirit and scope of this specification.

What is claimed is:

1. A method of determining permeability of a subsurface formation, the method comprising:
positioning a sample of the subsurface formation in a measurement cell;
fluidly connecting an inlet and an outlet of the sample to an upstream reservoir and a downstream reservoir, respectively;
flowing a fluid through the sample from the upstream reservoir to the downstream reservoir;
measuring changes of an upstream pressure associated with the upstream reservoir and a downstream pressure associated with the downstream reservoir in a measurement time period; and
determining a matrix permeability of the subsurface formation based on measurement data before the upstream pressure and the downstream pressure merge at a merging time point,
wherein determining the matrix permeability of the subsurface formation comprises:
determining an initial time point to be a time point no earlier than a declining time point when both the upstream pressure and the downstream pressure are larger than a central pressure at an axial center of the sample and start to decline,
extracting measurement data within a particular time range from the initial time point earlier than the merging time point to an ending time point, and
determining the matrix permeability of the subsurface formation using the extracted measurement data within the particular time range.

2. The method of claim 1, wherein determining the matrix permeability of the subsurface formation comprises:
determining the central pressure at the axial center of the sample using the upstream pressure and the downstream pressure according to a formula:

$$P_{ms} = -\left(\frac{V_{ur}}{V_p}\frac{3}{2} + \frac{1}{4}\right)P_{ur} - \left(\frac{V_{dr}}{V_p}\frac{3}{2} + \frac{1}{4}\right)P_{dr} + \frac{3}{2}\left(\frac{V_p + V_{ur} + V_{dr}}{V_p}\right)P_{\infty},$$

where $P_{ms}$, $P_{ur}$, and $P_{dr}$ represent the central pressure, the upstream pressure, and the downstream pressure, respectively, $V_{ur}$ and $V_{dr}$ represent volumes of the upstream reservoir and the downstream reservoir, respectively, $V_p$ represents a total volume of pores in the sample, and $P_{\infty}$ represents an equilibrium pressure at an end of the measurement time period when $P_{ur}$ and $P_{dr}$ are stable.

3. The method of claim 1, wherein determining the matrix permeability of the subsurface formation using the extracted measurement data within the particular time range comprises:
determining the matrix permeability based on data arrays G(t) and f(t) obtained from the extracted measurement data within the particular time range, wherein $$G(t) = \left(5AA + \frac{1}{2}\right)(P_{ur}(t) - P_{ur}(t_0)) + \left(5BB + \frac{1}{2}\right)(P_{dr}(t) - P_{dr}(t_0)),$$

and $$f(t) = \int_{t_0}^{t} \frac{1}{\mu \Phi C_g L^2} 48\left(\left(AA + \frac{1}{2}\right)P_{ur} + \left(BB + \frac{1}{2}\right)P_{dr} - (1 + AA + BB)P_{\infty}\right)dt,$$

where $AA=V_{ur}/V_p$, $BB=V_{dr}/V_p$, $V_{ur}$ and $V_{dr}$ represent volumes of the upstream reservoir and the downstream reservoir, respectively, $V_p$ represents a total volume of pores in the sample, $t_0$ represents the initial time point, t represents a time point within the particular time range, µ represents a viscosity of the fluid, Φ represents a porosity of the sample, L represents a length of the sample, and $C_g$ represents a compressibility of the fluid, $P_{ur}$ and $P_{dr}$ represent the upstream pressure and the downstream pressure, respectively, and $P_{\infty}$ represents an equilibrium pressure at an end of the measurement time period when $P_{ur}$ and $P_{dr}$ are stable after $P_{ur}$ and $P_{dr}$ merge.

4. The method of claim 3, wherein determining the matrix permeability based on the data arrays comprises:
determining the matrix permeability according to a formula:

$$G(t)=-kf(t)+C,$$

where k represents the matrix permeability, and C represents a constant.

5. The method of claim 4, wherein determining the matrix permeability based on the data arrays comprises:
performing linear regression or linear fitting on the data arrays to get a slope; and
determining the matrix permeability to be a negative of the slope.

6. The method of claim 1, further comprising:
before flowing the fluid through the sample, confining the measurement cell with a confining fluid to cause a confining pressure in the measurement cell; and
applying an effective stress pressure to the sample.

7. The method of claim 6, wherein flowing the fluid through the sample comprises:
flowing the fluid to apply a pore pressure to the sample, wherein the pore pressure is smaller than the confining pressure.

8. The method of claim 7, further comprising:
maintaining a pressure difference between the pore pressure and the confining pressure to be the effective stress pressure while flowing the fluid through the sample from the upstream reservoir to the downstream reservoir.

9. The method of claim 1, wherein measuring the changes of the upstream pressure and the downstream pressure in the measurement time period comprises:
carrying out a pressure pulse decay permeability (PDP) measurement.

10. The method of claim 1, further comprising:
preparing the sample of the subsurface formation by sealing a core plug sample of the subsurface formation with at least one layer of sleeve.

11. The method of claim 1, further comprising:
determining a fracture permeability of the subsurface formation based on the measurement data before the upstream pressure and the downstream pressure merge.

12. The method of claim 1, wherein the subsurface formation comprises at least one of shale, limestone, siltstone, or sandstone.

13. The method of claim 1, wherein the fluid comprises one or more gases from a group of gases including methane, argon, nitrogen, carbon dioxide, helium, ethane, and propane.

14. A system for determining permeability of a subsurface formation, the system comprising:
a measuring system comprising:
a measurement cell configured to contain a sample of the surface formation; and
upstream and downstream reservoirs fluidly connecting to an inlet and an outlet of the sample, respectively,
wherein the measuring system is configured to:
flow a fluid through the sample from the upstream reservoir to the downstream reservoir, and
measure changes of an upstream pressure associated with the upstream reservoir and a downstream pressure associated with the downstream reservoir in a measurement time period; and
a computing system configured to determine a matrix permeability of the subsurface formation based on measurement data before the upstream pressure and the downstream pressure merge at a merging time point,
wherein the computing system is configured to:
determine an initial time point to be a time point no earlier than a declining time point when both the upstream pressure and the downstream pressure are larger than a central pressure at an axial center of the sample and start to decline,
extract measurement data within a particular time range from the initial time point earlier than the merging time point to an ending time point, and
determine the matrix permeability of the subsurface formation using the extracted measurement data within the particular time range.

15. The system of claim 14, wherein the measuring system is configured to:
before flowing the fluid through the sample, confine the measurement cell with a confining fluid to cause a confining pressure in the measurement cell;
apply an effective stress pressure to the sample;
flow the fluid to apply a pore pressure to the sample, wherein the pore pressure is smaller than the confining pressure; and
maintain a pressure difference between the pore pressure and the confining pressure to be the effective stress pressure while flowing the fluid through the sample from the upstream reservoir to the downstream reservoir.

16. The system of claim 14, wherein the measuring system is configured to measure the changes of the upstream pressure and the downstream pressure in the measurement time period by carrying out a pressure pulse decay permeability (PDP) measurement.

17. The system of claim 14, wherein the computing system is configured to:
determine data arrays G(t) and f(t) obtained from the extracted measurement data within the particular time range, wherein $$G(t) = \left(5AA + \frac{1}{2}\right)(P_{ur}(t) - P_{ur}(t_0)) + \left(5BB + \frac{1}{2}\right)(P_{dr}(t) - P_{dr}(t_0)),$$

and $$f(t) = \int_{t_0}^{\tau} \frac{1}{\mu \Phi C_g L^2} 48\left(\left(AA + \frac{1}{2}\right)P_{ur} + \left(BB + \frac{1}{2}\right)P_{dr} - (1 + AA + BB)P_{\infty}\right)dt,$$

and determine the matrix permeability based on the data arrays according to a formula:

$G(t) = -kf(t) + C,$ where k represents the matrix permeability, C represents a constant, $AA = V_{ur}/V_p$, $BB = V_{dr}/V_p$, $V_{ur}$ and $V_{dr}$ represent volumes of the upstream reservoir and the downstream reservoir, respectively, $V_p$ represents a total volume of pores in the sample, $t_0$ represents the initial time point, t represents a time point within the particular time range, μ represents a viscosity of the fluid, Φ represents a porosity of the sample, L represents a length of the sample, and $C_g$ represents a compressibility of the fluid, $P_{ur}$ and $P_{dr}$ represent the upstream pressure and the downstream pressure, respectively, and $P_{\infty}$ represents an equilibrium pressure at an end of the measurement time period when $P_{ur}$ and $P_{dr}$ are stable after $P_{ur}$ and $P_{dr}$ merge.

18. A method of determining permeability of a subsurface formation, the method comprising:
positioning a sample of the subsurface formation in a measurement cell;
fluidly connecting an inlet and an outlet of the sample to an upstream reservoir and a downstream reservoir, respectively;
flowing a fluid through the sample from the upstream reservoir to the downstream reservoir;
measuring changes of an upstream pressure associated with the upstream reservoir and a downstream pressure associated with the downstream reservoir in a measurement time period; and
determining a matrix permeability of the subsurface formation based on measurement data before the upstream pressure and the downstream pressure merge at a merging time point,
wherein determining the matrix permeability of the subsurface formation comprises:
determining a central pressure at an axial center of the sample using the upstream pressure and the downstream pressure according to a formula:

$$P_{ms} = -\left(\frac{V_{ur}}{V_p}\frac{3}{2} + \frac{1}{4}\right)P_{ur} - \left(\frac{V_{dr}}{V_p}\frac{3}{2} + \frac{1}{4}\right)P_{dr} + \frac{3}{2}\left(\frac{V_p + V_{ur} + V_{dr}}{V_p}\right)P_{\infty},$$

where $P_{ms}$, $P_{ur}$, and $P_{dr}$ represent the central pressure, the upstream pressure, and the downstream pressure, respectively, $V_{ur}$ and $V_{dr}$ represent volumes of the upstream reservoir and the downstream reservoir, respectively, $V_p$ represents a total volume of pores in the sample, and $P_{\infty}$ represents an equilibrium pressure at an end of the measurement time period when $P_{ur}$ and $P_{dr}$ are stable;
determining an initial time point when the upstream pressure and the downstream pressure are larger than the central pressure;
extracting measurement data within a particular time range from the initial time point earlier than the merging time point to an ending time point; and
determining the matrix permeability of the subsurface formation using the extracted measurement data within the particular time range.

19. The method of claim 18, wherein the initial time point is a time point no earlier than a declining time point when both the upstream pressure and the downstream pressure start to decline.

20. The method of claim 18, wherein determining the matrix permeability of the subsurface formation using the extracted measurement data within the particular time range comprises:
determining the matrix permeability based on data arrays G(t) and f(t) obtained from the extracted measurement data within the particular time range,
wherein $$G(t) = \left(5AA + \frac{1}{2}\right)(P_{ur}(t) - P_{ur}(t_0)) + \left(5BB + \frac{1}{2}\right)(P_{dr}(t) - P_{dr}(t_0)),$$

and $$f(t) = \int_{t_0}^{\tau} \frac{1}{\mu \Phi C_g L^2} 48\left(\left(AA + \frac{1}{2}\right)P_{ur} + \left(BB + \frac{1}{2}\right)P_{dr} - (1 + AA + BB)P_{\infty}\right)dt,$$

where $AA = V_{ur}/V_p$, $BB = V_{dr}/V_p$, $V_{ur}$ and $V_{dr}$ represent volumes of the upstream reservoir and the downstream reservoir, respectively, $V_p$ represents a total volume of pores in the sample, $t_0$ represents the initial time point, t represents a time point within the particular time range, μ represents a viscosity of the fluid, Φ represents a porosity of the sample, L represents a length of the sample, and $C_g$ represents a compressibility of the fluid, $P_{ur}$ and $P_{dr}$ represent the upstream pressure and the downstream pressure, respectively, and $P_{\infty}$ represents an equilibrium pressure at an end of the measurement time period when $P_{ur}$ and $P_{dr}$ are stable after $P_{ur}$ and $P_{dr}$ merge.

* * * * *